Aug. 11, 1931.      L. STALDER      1,818,169
DEFLECTING MECHANISM
Filed Nov. 19, 1927
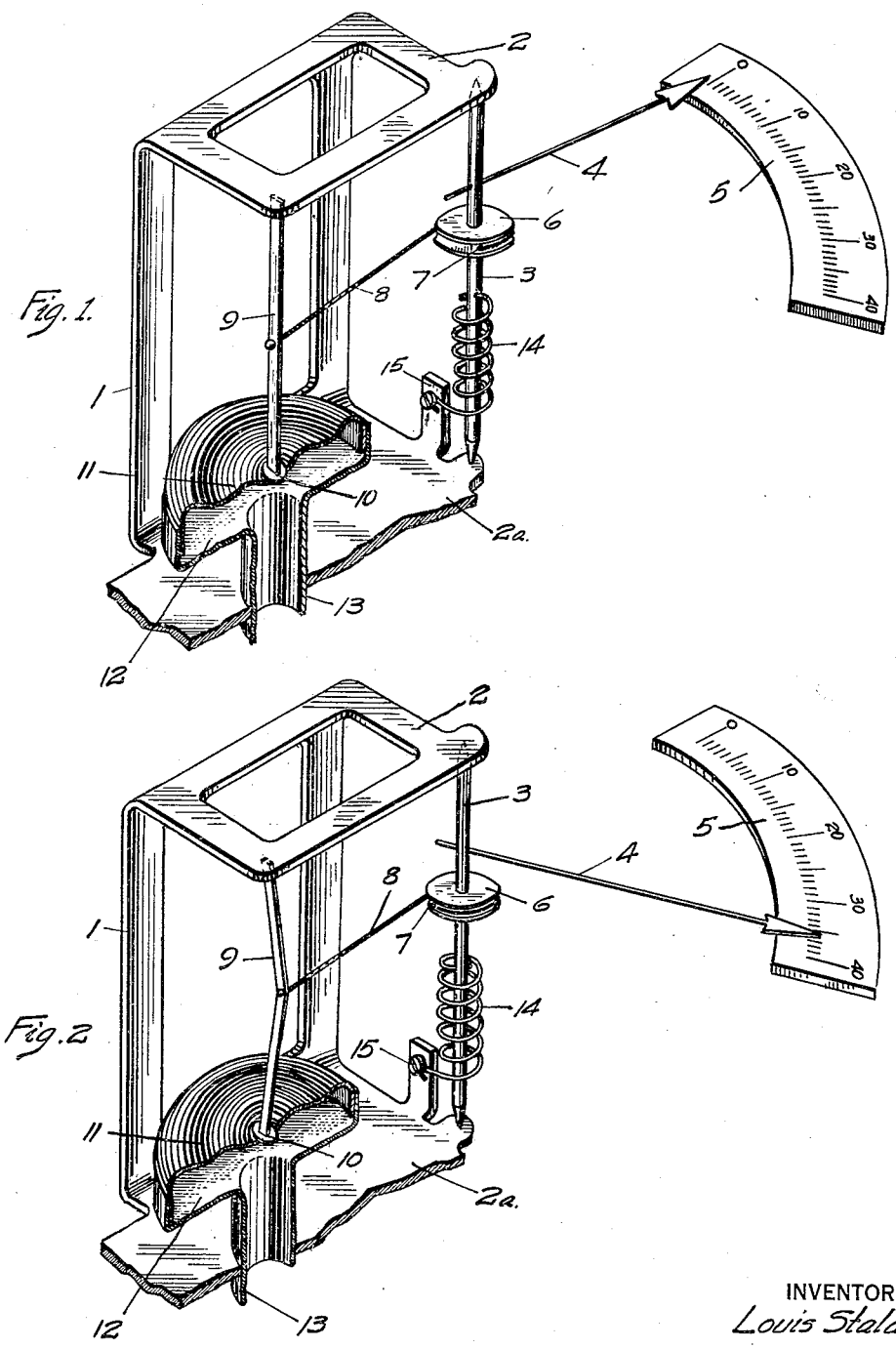
INVENTOR
Louis Stalder.
BY
Wesley J. Carr
ATTORNEY.

Patented Aug. 11, 1931

1,818,169

UNITED STATES PATENT OFFICE

LOUIS STALDER, OF TURTLE CREEK, PENNSYLVANIA, ASSIGNOR TO WESTINGHOUSE ELECTRIC & MANUFACTURING COMPANY, A CORPORATION OF PENNSYLVANIA

DEFLECTING MECHANISM

Application filed November 19, 1927. Serial No. 234,412.

My invention relates to deflecting mechanism such, for example, as may be utilized for indicating the pressure of a fluid medium.

In accordance with my invention, a deflecting member or pointer is biased in one direction, and the biasing means is restrained by a structure comprising a member responsive to changes in a condition of a quantity.

Further, in accordance with my invention, the aforesaid structure comprises a resilient diaphragm that is responsive to changes in pressure of a fluid medium.

Further, in accordance with my invention, a deflecting member or pointer is secured to a spring-controlled shaft carrying a drum to which is connected a flexible member connected to a resilient member projecting from a diaphragm, or the like.

My invention resides in the mechanism and features of construction of the character hereinafter described and claimed.

For an illustration of one of the forms my mechanism may take, reference is to be had to the accompanying drawings in which Figure 1 is a perspective view of deflecting mechanism constructed in accordance with my invention.

Fig. 2 is a perspective view similar to Fig. 1 but showing another position of the parts.

In the drawings, is illustrated a suitable frame or supporting member 1 comprising, in the example shown, a pair of spaced members 2 and 2a projecting laterally therefrom. Journalled on the members 2 and 2a is a shaft 3 to which is secured a pointer or deflecting member 4 to coact with or play over a suitable scale 5.

Rotatably secured to the shaft 3 is a drum or pulley 6 having secured thereto at 7 one end of a link 8 such, for example, as a flexible wire which loosely extends partly around the drum 6. The other end of link 8 is secured to a member 9 formed of suitable resilient material, such as phosphor bronze. The upper end of member 9, as viewed in Fig. 1, is suitably secured to the member 2 while the other end of said member 9 preferably has secured thereto a disk or member 10 engaging the central portion of a movable member or diaphragm 11 forming, in part, the wall structure of a chamber 12 with which a pipe or conduit 13 communicate. Diaphragm 11, preferably, is circumferentially corrugated and is formed of suitable resilient material, such as phosphor bronze.

In accordance with my invention, pointer 4 is suitably biased in a clockwise direction, (Fig. 1). To this end, the shaft 3 may be disposed within a helical spring 14, one end of which is secured to said shaft 3 and the other end of which is secured to a member 15 extending from the member 2a.

With the parts in the position illustrated in Fig. 1, spring 14 constantly tends to move pointer 4 in a clockwise direction. Member 9, however, opposes, and is of such character as to prevent the spring 14 from moving pointer 4 in a clockwise direction until the diaphragm 11 moves upwardly (Fig. 1).

Such movement of the diaphragm 11 may be effected in response to changes in a condition of some quantity. Thus, the conduit 13 may communicate with a chamber containing a fluid under pressure such, for example, as the casing of an internal-combustion engine in which the lubricating liquid is under pressure.

The mechanism hereinbefore described is so designed that diaphragm 11 and member 9 assume the positions illustrated in Fig. 1 when the lower face of diaphragm 11, (Fig. 1), is subjected to zero pressure. However, upon progressive increase of pressure of the medium within chamber 12, diaphragm 11 is moved upwardly, (Fig. 2), to greater and greater extent. As a result, the member 9 is bowed or moved toward the pulley 6 an amount depending upon the movement of the diaphragm 11, and the spring 14 becomes effective to move the pointer 4 with respect to scale 5 to thereby indicate the magnitude of the pressure in chamber 12.

It will be understood that the scale 5 may be calibrated as found suitable or desirable in view of the particular condition of the quantity to be observed. Thus, when movement of the pointer 4 is controlled by changes in oil pressure, the scale 5 may be calibrated to indicate pounds per square inch.

It will also be understood that my invention has been illustrated only in an elementary manner and that, in actual practice, the apparatus to be utilized may depart widely from that shown on the drawings.

I claim as my invention:

1. The combination with a deflecting member, of means for biasing said member in one direction, and means for restraining said biasing means, said second named means comprising a diaphragm and a resilient member both responsive to changes in a condition of a quantity.

2. The combination with a shaft, and a deflecting member carried thereby, of means for biasing said shaft and deflecting member in one direction, a diaphragm, a resilient member projecting therefrom, and a connection between said shaft and resilient member.

3. The combination with a shaft, a drum rotatable therewith, and a deflecting member carried by said shaft, of means for biasing said shaft and deflecting member in one direction, a diaphragm, a resilient member projecting therefrom, and a connection between said drum and resilient member.

4. The combination with a shaft, a drum rotatable therewith, and a deflecting member carried by said shaft, of means for biasing said shaft and deflecting member in one direction, a diaphragm, included in the wall structure of a pressure chamber, a resilient member projecting therefrom, and a connection between said drum and resilient member.

5. The combination with a deflecting member, of means for biasing the same in one direction, and means for restraining said biasing means comprising a diaphragm and an elongated laterally-deflective element disposed normal to the surface of the diaphragm with one end connected thereto and its other end secured to a stationary element.

6. A fluid-measuring device comprising a pointer, a shaft therefor, a helical spring surrounding the shaft having one end connected thereto and one end connected to a stationary element for biasing the shaft in one direction, a diaphragm, an elongated laterally-deflective element disposed substantially normal to the surface of the diaphragm with one end connected thereto and its other end secured to a stationary element, and a flexible filamentary element secured at one end to an intermediate portion of said elongated element and having a portion wound about said shaft in a direction opposing movement of the shaft by said spring.

In testimony whereof, I have hereunto subscribed my name this 10th day of November, 1927.

LOUIS STALDER.